3,153,350
HAND OPERATED ACCELERATOR PEDAL
CONTROL
Harry S. Dishart, 135 Prospect Park SW.,
Brooklyn 18, N.Y.
Filed Apr. 10, 1963, Ser. No. 271,955
5 Claims. (Cl. 74—482)

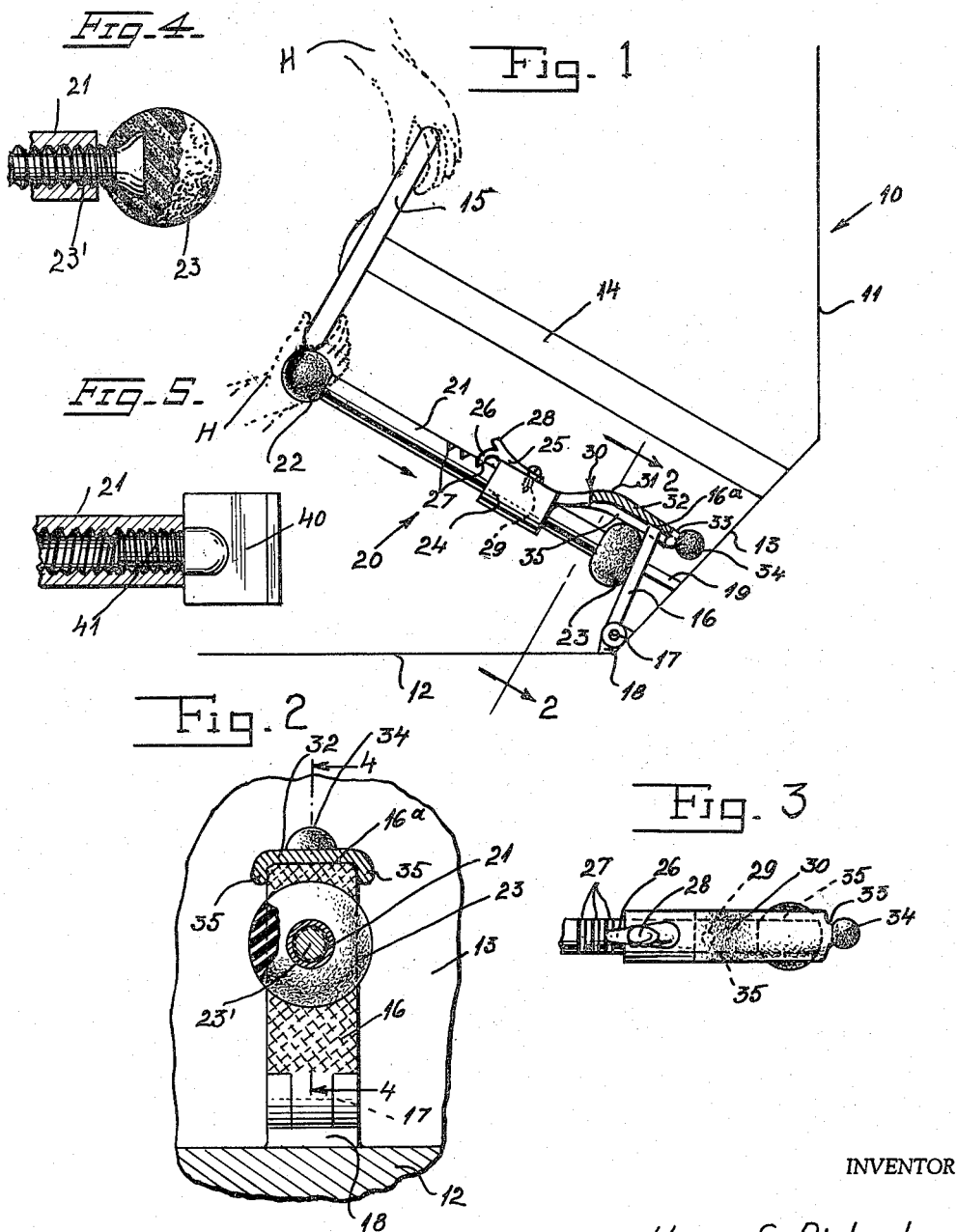

This invention relates to a hand operated accelerator pedal control, and is particularly adapted for use with motor vehicles, such as passenger cars, trucks, buses or the like.

A primary object of this invention is the provision of a control which may be associated with the conventional foot operated accelerator pedal of a motor vehicle whereby the same may be depressed as desired manually, in order to relieve the strain on the foot of the operator, and prevent tiring.

An additional object of the invention is the provision of such a device which is provided with an adjustable stop member so arranged that the speed of the vehicle may be predetermined, and maintained by contact of the stop with the vehicle floor board, permitting the exertion of a continuous relatively heavy pressure without any increase in speed.

A further object of the invention resides in the provision of an improved means for adjusting such a stop member with a relatively high degree of precision so that any desired speed within the capabilities of the vehicle may be maintained, from a relatively low to a relatively high speed as desired.

A further object of the invention resides in the provision of resilient means at the upper end of the control handle providing a cushion which is comfortable to the hand when grasped by an operator.

An additional object of the invention resides in the provision of additional cushioning means at the opposite end of the control rod so arranged that when depressed against the accelerator pedal, in the event that the device is suddenly released, the natural resiliency of the last mentioned cushion will immediately disengage the control from the accelerator pedal, and bounce the same back onto the seat or into the vehicle, the cushioning members at the opposite ends of the rod preventing any damage to the interior of the vehicle or its occupants.

A further object of the invention is the provision of a device of this character which is sturdy and durable in construction, reliable and efficient in operation, restful to use, and relatively simple and inexpensive to manufacture.

Still other objects reside in the combinations of elements, arrangements of parts, and features of construction, all as will be more fully pointed out hereinafter and disclosed in the accompanying drawings, wherein there is shown a preferred embodiment of this inventive concept.

In the drawings:

FIGURE 1 is a side view, partially in elevation, and partially in section, showing one form of device constructed in accordance with the instant invention applied to the accelerator pedal of a conventional motor vehicle, certain portions of the interior thereof being shown schematically.

FIG. 2 is an enlarged sectional view taken substantially along the line 2—2 of FIG. 1 as viewed in the direction indicated by the arrows, and FIG. 3 is a fragmentary top plan view of the device of FIG. 1, parts thereof being broken away, and certain concealed parts being indicated in dotted lines, FIG. 4 is an enlarged fragmentary longitudinal sectional view of the lower end of the device as viewed on line 4—4 of FIG. 2 illustrating the adjustment of the resilient ball in the sleeve end to adjust the overall length of the device, and FIG. 5 is a sectional view similar to FIG. 4 but with the ball replaced by an ice scraping tool or the like.

Similar reference characters refer to similar parts throughout the several views of the drawings.

Having reference now to the drawings in detail, the interior of a conventional motor vehicle such as an automobile is generally indicated at 10, with the fire wall or front panel being shown at 11, the floor at 12, and the inclined portion of the floor board at 13. The usual steering column 14 carries a conventional steering wheel 15.

An accelerator pedal 16 is pivotally mounted on a pivot 17 attached to a bracket 18 in the usual manner, and is connected to a throttle rod 19, also in conventional manner, the throttle being of any desired conventional type.

The device of the instant invention is generally indicated at 20 and comprises an elongated substantially straight rod or sleeve 21, which has suitably secured to its upper extremity a ball 22, preferably of sponge rubber or a similar compressible resilient substance which is adapted to be grasped by the hand H of the operator of the vehicle while on the wheel and compressed to conform to the wheel and palm of the hand H. This rod 21 is of a length conveniently to reach from a position conveniently accessible to the right hand of the driver on the wheel to the accelerator pedal 16, and adjustably carries at its lower end a resilient ball or cushion 23 of sponge rubber or similar material which is adapted to bear against the pedal 16, pressure on the upper ball 22 resulting in flattening or slight compression of the lower ball 23 against the accelerator pedal conforming to the pedal surface and frictionally gripping the same. This, in addition to insuring a firm and slip-proof contact with the pedal, provides a certain compression of the lower ball, which, in the event that the hand is released from the upper ball 22, serves immediately to disengage the control member 20 from the accelerator pedal permitting the same to move back to inoperative position, and at the same time throws the rod 21 and its associated mechanism out of the way. The resilient balls 22 and 23 at either end prevent the ejected rod from doing any damage to the interior of the vehicle or to the person of the operator or passengers. The lower ball 23 has a threaded attaching piece 23' that can be adjusted out of the threaded end of the sleeve 21 as illustrated in FIG. 4 to adjust the overall length of the device. Likewise, the upper ball 22 may be similarly connected for adjustment purposes.

Adjacent its lower extremity a sleeve 24 is positioned around rod 21 and is linearly movable therealong. This sleeve 24 is applied to the rod 21 by removing the ball 23. A detent spring catch 25 is provided with a tooth or dog 26 which engages in a selected one of a series of notches or grooves 27 which extend transversely of the rod, and afford detent means into which the tooth 26 may engage. A finger engaging portion 28 permits the detent or catch 25 to be moved upwardly against a spring bias and the retaining screw 29 that fastens the catch 25 to the sleeve 24 in such manner that the sleeve 24 may be moved linearly of the rod 21 as desired. Fixedly secured to the lower portion of the sleeve 24 is a plate 30 which includes an offset portion 31 and a depending portion 32 which extends in parallelism to rod 21, and terminates in a reduced end portion 33. This reduced end portion 33 carries a small ball 34 of sponge rubber or similar material, and extends below the end or extremity 16a of the accelerator pedal 16. The sides of portion 32 are inturned to provide side flanges 35, these flanges 35 extending about the sides of the end 16a of accelerator 16, and preventing lateral disalignment or slippage of rod 21 and its associated resilient ball 23 from the accelerator.

The sponge ball 23 may be screwed from the rod 21 and replaced by an ice scraper tool element 40 having a threaded engaging portion 41 adapted to engage the threaded end of the rod 21. Similarly threaded tool elements, not shown, such as brushes, tire lifts, washers, waxers, tools, etc. may likewise replace the resilient ball 23 and be similarly attached to the rod 21 so that it becomes a handle therefor especially for places hard to reach. It may also be used as a safety holder for hood and trunk top and as a handy weapon in case the driver of the vehicle is molested and threatened, the rubber ball being little harmful but effective upon the intruder from open car window.

The arrangement is thus such that in accordance with the position of adjustable sleeve 24 on rod 21, such position being secured by the engagement of tooth 26 in a selected notch 27, the relative extension of ball 34 below the accelerator pedal end 16a and relative to the inclined floor board portion 13 may be readily determined. By trial and error it can be determined just how much such extension must be in order to insure driving at a selected speed, and once such speed is determined, the sleeve may be set so that downward pressure on the control rod, allowing for compression of resilient ball members 23 and 34, will retain the vehicle at the desired speed regardless of any excessive pressure thereon.

Obviously as pressure on hand ball 22 is released, the accelerator pedal will rise, and, if released entirely, the entire device will be thrown clear of the accelerator due to the resiliency of the sponge ball 23 and so that the device may be immediately accessible for conventional foot pressure if desired.

By the use of this device, sleeping on the wheel is prevented as the palm of the hand engaging the ball of the device keeps the mind more steady and gives means for control when overtired of pressing the foot pedal. The device will be most helpful to drivers that have easily irritated and tired feet, especially when completing long trips.

From the foregoing it will now be seen that there is herein provided an improved hand control for accelerator pedals which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. A hand control for a vehicle accelerator pedal comprising an elongated rod of a length sufficient to extend from the top of an accelerator to a position convenient to the hand of the driver of a vehicle while on the steering wheel, a compressible resilient ball on one end of said rod affording a comfortable hand grip for the hand of the driver and adapted to conform to the surface of the hand wheel, and a second compressible resilient ball on the opposite end of said rod adapted to bear against the top of the pedal in substantially slipproof relation, and by its compression, project said rod out of the way of the pedal when the hand grip is released, and a sleeve slidably mounted on said rod, means provided on said sleeve for retaining the same in a selected position of linear adjustment on the rod, an arm secured to said sleeve and extending beyond the end of the accelerator pedal to limit the downward movement of the pedal.

2. The structure of claim 1, wherein the means for retaining the sleeve in a selected position on the rod comprises a series of notches on said rod and a spring biased dog carried by said sleeve.

3. The structure of claim 2, wherein the end of said arm is provided with a third compressible resilient ball.

4. The structure of claim 3, wherein said arm includes an offset portion extending from said sleeve and a straight portion extending parallel to and beyond the end of said sleeve, and side flanges on said straight portion adapted to engage the sides of the end of the accelerator pedal.

5. The structure of claim 4, wherein the end of said arm is reduced, beyond the end of said side flanges, and said reduced end is inserted in said third compressible resilient ball to provide a support therefor.

References Cited in the file of this patent
UNITED STATES PATENTS

| | | |
|---|---|---|
| 1,232,449 | Mellin | July 3, 1917 |
| 1,385,642 | Restein | July 26, 1921 |
| 2,732,725 | Joyce | Jan. 31, 1956 |
| 2,930,250 | Atran | Mar. 29, 1960 |